United States Patent
Kwon et al.

(10) Patent No.: US 12,293,292 B2
(45) Date of Patent: May 6, 2025

(54) MULTIPLE-INPUT MULTIPLE-OUTPUT (MIMO) DETECTOR SELECTION USING NEURAL NETWORK

(71) Applicant: Samsung Electronics Co., Ltd., Gyeonggi-do (KR)

(72) Inventors: Hyukjoon Kwon, San Diego, CA (US); Shailesh Chaudhari, San Diego, CA (US); Kee-Bong Song, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 1505 days.

(21) Appl. No.: 16/429,856

(22) Filed: Jun. 3, 2019

(65) Prior Publication Data
US 2020/0293894 A1    Sep. 17, 2020

Related U.S. Application Data (60) Provisional application No. 62/817,372, filed on Mar. 12, 2019.

(51) Int. Cl.
| | | |
|---|---|---|
| *G06N 3/084* | (2023.01) | |
| *G06F 16/28* | (2019.01) | |
| *G06N 3/04* | (2023.01) | |

(52) U.S. Cl.
CPC .......... *G06N 3/084* (2013.01); *G06F 16/285* (2019.01); *G06N 3/04* (2013.01)

(58) Field of Classification Search
CPC ......... G06F 16/285; G06N 3/04; G06N 3/084
USPC .......................................................... 706/25
See application file for complete search history.

(56) References Cited

U.S. PATENT DOCUMENTS

| | | | |
|---|---|---|---|
| 8,040,959 | B2 | 10/2011 | Waters et al. |
| 8,638,887 | B1 | 1/2014 | Choi et al. |
| 9,674,003 | B2 | 6/2017 | Kant et al. |
| 10,594,729 | B2 * | 3/2020 | Kraenzel ............... G06F 16/951 |
| 10,637,544 | B1 * | 4/2020 | Shattil .................. H04B 7/0473 |
| 10,756,790 | B2 * | 8/2020 | Shattil .................... H04B 7/024 |
| 10,892,806 | B2 * | 1/2021 | O'Shea .................... G06N 3/08 |
| 2010/0027703 | A1 | 2/2010 | Yeh et al. |
| 2019/0273510 | A1 * | 9/2019 | Elkind ................... G06N 20/00 |

OTHER PUBLICATIONS

Samuel et al., "Deep MIMO Detection" 2017, IEEE , 5 pages. (Year: 2017).*
Yoon et al., "Implementation of Low-Complexity MIMO Detector and Efficient Soft-Output Demapper for MIMO-OFDM-based Wireless LAN Systems", 2013, Springer, pp. 1-7. (Year: 2013).*
Rusek et al., "Scaling up MIMO: Opportunities and Challenges with Very Large Arrays", 2012, download from https://arxiv.org/ , 30 pages. (Year: 2012).*

(Continued)

*Primary Examiner* — Ted T. Vo
(74) *Attorney, Agent, or Firm* — The Farrell Law Firm, P.C.

(57) ABSTRACT

A method and system for multiple-input multiple-output (MIMO) detector selection using a neural network is herein disclosed. According to one embodiment, a method includes generating a labelled dataset of features and detector labels, training a multi-layer perceptron (MLP) network using the generated labelled dataset, and selecting a detector class from a plurality of detector classes based on outputs of the trained MLP network.

14 Claims, 8 Drawing Sheets

(56) References Cited

OTHER PUBLICATIONS

Suh et al., "Reduced-Complexity MIMO Detection via a Slicing Breadth-First Tree Search", 2017, IEEE, pp. 1536-1276. (Year: 2017).*
Bertrand M. Hochwald et al., "Achieving Near-Capacity on a Multiple-Antenna Channel", Aug. 6, 2001, 28 pages.
Jungwon Lee et al., "MIMO Maximum Likelihood Soft Demodulation Based on Dimension Reduction", Globecom 2010, Dec. 8, 2010, 18 pages.
Mojtaba Rahmati et al., "Low Complexity Soft Detection of High Order QAM with Prior Information", IEEE Xplore, 2015, 5 pages.
Shailesh Chaudhari et al., "Reliable and Low-Complexity MIMO Detector Selection using Neural Network", Oct. 11, 2019, 8 pages.
3GPP, 3rd Genertion Partnership Project; Technical Specification Group Radio Access Network; NR; Physical Channels and Modulation (Release 15), 3GPP TS 38.211 V15.2.0, Jun. 2018, 91 pages.
Juquan Mao et al., "A Low Complexity 256QAM Soft demapper for 5G Mobile System", Conference Paper, ResearchGate, Jun. 2016, 6 pages.
3GPP, 3rd Generation Partnership Project; Technical Specification Group Radio Access Network; NR; Physical Layer Procedures for Data (Relase 15), 3GPP TS 38.214 V15.2.0, Jun. 2018, 95 pages.
Roberto Battiti, "Using Mutual Information for Selecting Features in Supervised Neural Net Learning", IEEE Transactions on Neural Networks, Jul. 1994, 14 pages.

* cited by examiner

MULTIPLE-INPUT MULTIPLE-OUTPUT (MIMO) DETECTOR SELECTION USING NEURAL NETWORK

PRIORITY

This application is based on and claims priority under 35 U.S.C. § 119(e) to a U.S. Provisional Patent Application filed on Mar. 12, 2019 in the United States Patent and Trademark Office and assigned Ser. No. 62/817,372, the entire contents of which are incorporated herein by reference.

FIELD

The present disclosure is generally related to wireless communication systems. In particular, the present disclosure is related to multiple-input multiple-output detector selection using a neural network.

BACKGROUND

In a wireless communication system (e.g., long term evolution (LTE), $5^{th}$ generation new radio (5G NR)), a multiple-input multiple-output (MIMO) symbol detector computes log-likelihood-ratios (LLRs) of the coded bits in MIMO layers. The LLRs may be determined using various types of detection methods. The complexities of such detection methods range from very high complexity (e.g., maximum likelihood (ML)) to low complexity (e.g., minimum mean square error (MMSE)). Typically, the performance of the detection method, measured in terms of an error rate, is inversely proportional to the complexity. Therefore, an ML has minimum error rate while an MMSE has maximum error rate.

Typically, one detector is used to obtain LLRs for all resource elements (REs) irrespective of channel conditions in the REs. When choosing to use such a static detector, there is a trade-off between complexity and error rate. If low error rate is desired, then a high complexity detector is used. On the other hand, if a low complexity detector is used, then the error rate increases.

SUMMARY

According to one embodiment, a method includes generating a labelled dataset of features and detector labels, training a multi-layer perceptron (MLP) network using the generated labelled dataset, and selecting a detector class from a plurality of detector classes based on outputs of the trained MLP network.

According to one embodiment, a system includes a plurality of detectors, each of the detectors associated with a detector class from a plurality of detector classes, a memory, and a processor configured to generate a labelled dataset of features and detector labels, train an MLP network using the generated labelled dataset and select a detector class from the plurality of detector classes based on outputs of the trained MLP network.

According to one embodiment, a method includes generating a labelled dataset of features and detector labels, merging classes of the plurality of detector classes based on the generated labelled dataset, training an MLP network using the generated labelled dataset, and selecting a detector class from a plurality of detector classes based on outputs of the trained MLP network

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure provides a system and method for selection of a multiple-input multiple-output (MIMO) detector to detect symbols in a resource element (RE). The system and method selects the detector based on instantaneous channel conditions in the RE using a neural network, such as a multi-layer perceptron (MLP). An MLP is a type of neural network widely used in machine learning for classification and parameter estimation. The system and method use an MLP to dynamically select a reliable low-complexity detector depending on the channel condition in each RE. The system and method allow the modem to simultaneously keep the detector complexity low and achieve error rate of maximum likelihood (ML) by dynamically selecting a reliable low-complexity detector to generate log-likelihood ratios (LLRs).

Figure 1:
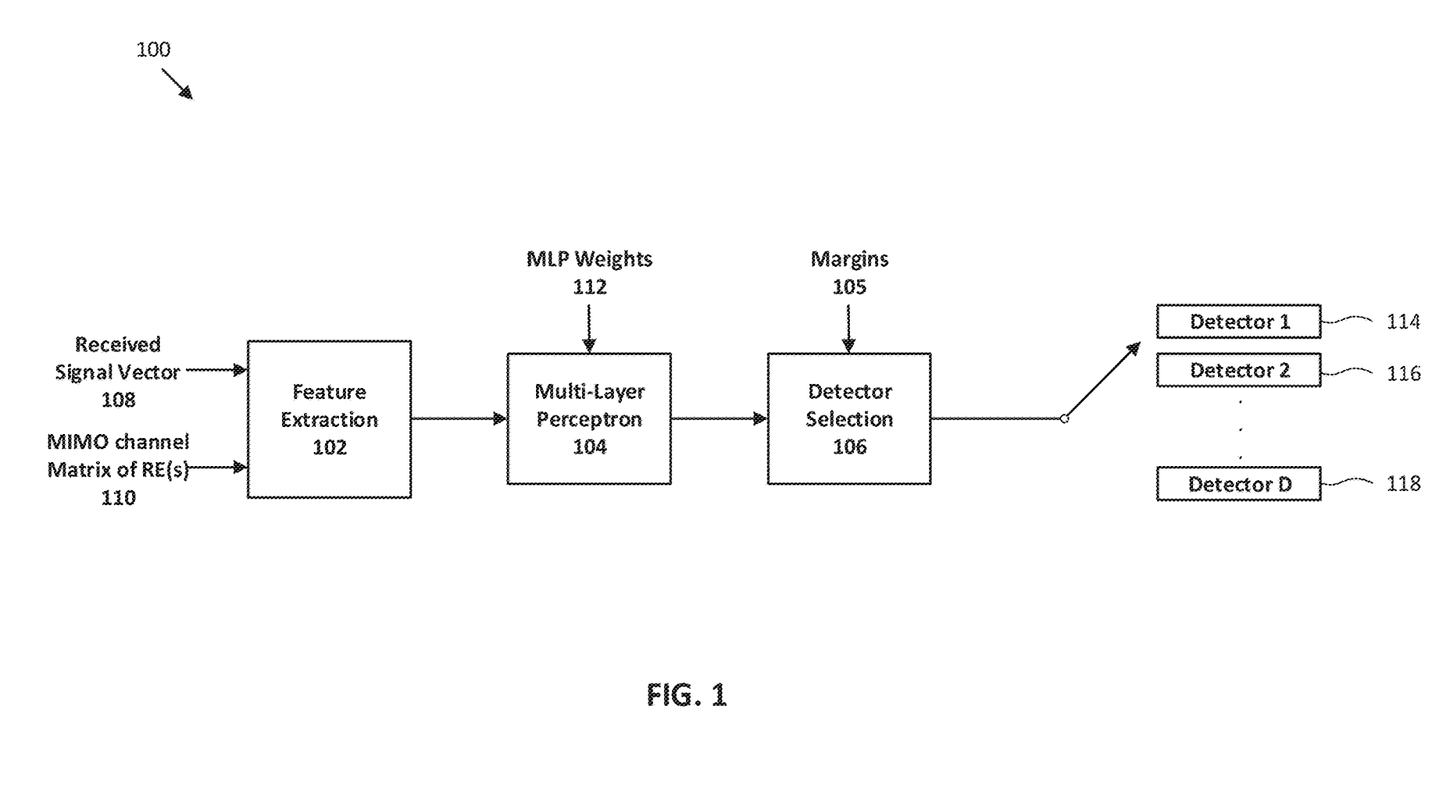
FIG. 1 is a diagram of a system for MIMO detector selection, according to an embodiment.

FIG. 1 is a diagram of a system 100 for MIMO detector selection, according to an embodiment. The system 100 includes a feature extraction block 102, an MLP 104, a detector selection block 106, and a plurality of detectors (e.g., detector 1 114, detector 2 116 . . . detector D 118). A received signal vector 108 and the MIMO channel matrix of RE(s) 110 are sent to the feature extraction block 102. MLP weights 112 are applied in the MLP 104.

The features are provided as input to the MLP network 104. The features selected may represent the channel, received signal, noise variance, and other features. Other features include eigenvalues of the channel, diagonal values of the channel matrix, an inner product of received signals and channel. The system 100 applies the MLP network 104 as a classifier to classify each RE into different classes based on its channel features, where each class corresponds to a detector. For each RE, the MLP 104 provides D outputs, where D is the number of detector classes or candidate detectors. The dth output of MLP 104 indicates whether or not the detector d is the lowest-complexity detector that can provide performance similar to the ML detector. Inaccurate prediction by the MLP 104 can increase the error rate. Therefore, the outputs of the MLP 104 are further processed in the detector selection block 106 that selects a highly reliable, low-complexity detector that matches an error rate of the ML. The parameters of the MLP 104 (i.e., MLP weights 112 and the parameters (i.e., the margins 105) of the detector selection block 106) are tuned offline using the labelled dataset having channel features and corresponding labels of detector. The labelled dataset is collected under different channel models and signal-to-noise ratios (SNRs).

Figure 2:
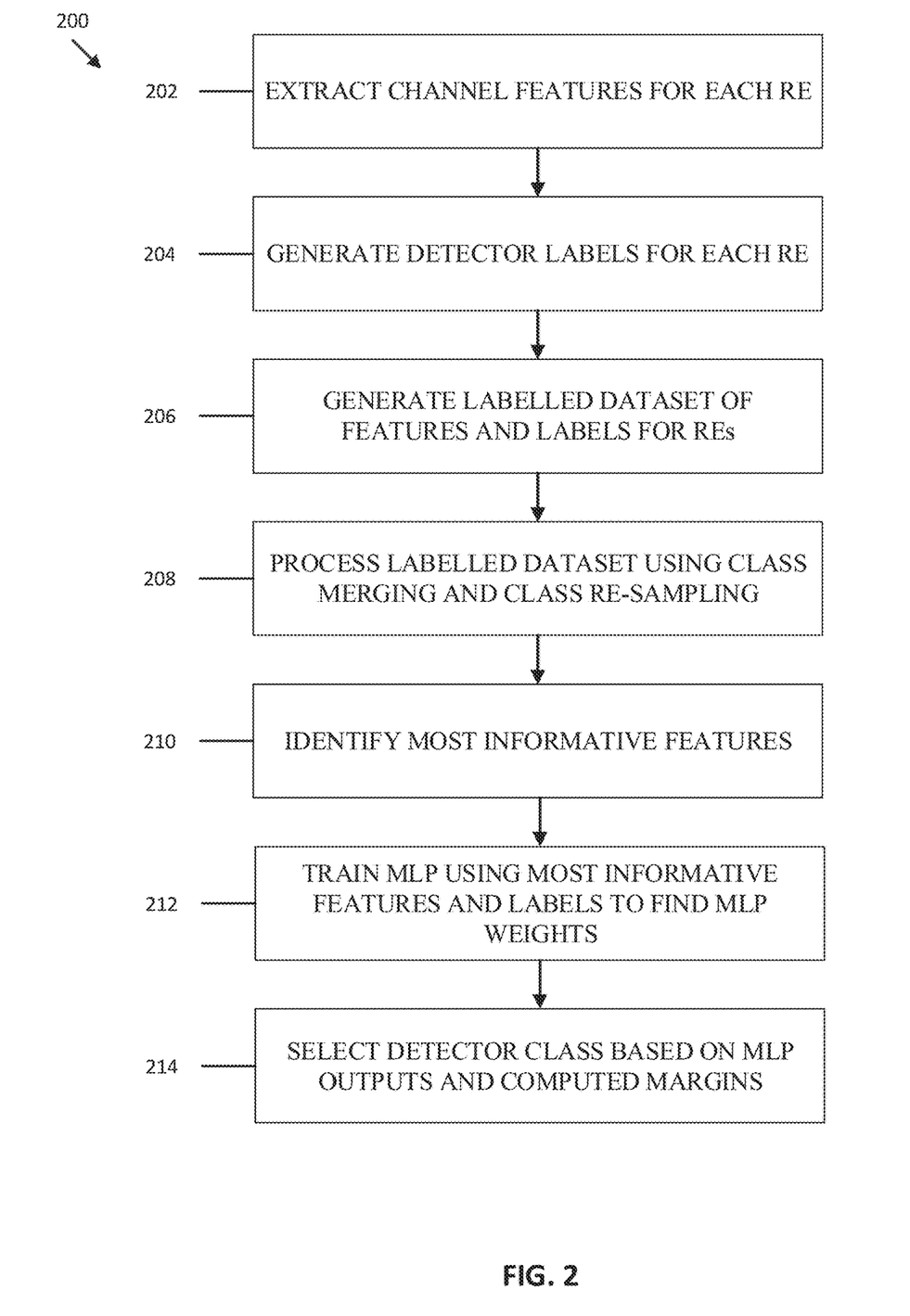
FIG. 2 is a flowchart of an offline tuning method to compute MLP weights and margins, according to an embodiment.

FIG. 2 is a flowchart 200 of offline tuning method to compute MLP weights 112 and margins 105, according to an embodiment. At 202, the system extracts channel features. The instantaneous channel features are extracted from the MIMO channel matrix 110 in the RE. Features can also be extracted from MIMO channel matrices of a group of REs. The MIMO channel matrix 110 is indicated by H and received signal vector 108 is indicated by y, which may be expressed as in Equation (1).

$$y=Hx+n \qquad (1)$$

In Equation (1), x is the vector containing the transmitted symbols and n is the noise vector. It may be assumed that the noise is whitened. The dimensions of matrices y, H, x, and n are R×1, R×T, T×1, and R×1, respectively, where R is the number of receiver antennas and T is the number of transmitted symbols.

The channel features may include, but not limited to, the following:

Feature-1 ($f_1$): Total channel power: $\Sigma_{ij}|h_{ij}|^2$, where $h_{ij}$ is the element at the ith row and jth column in matrix H;

Feature-2 ($f_2$): Ratio of diagonal-to-off-diagonal channel power;

Feature-3 ($f_3$): Ratio of the largest and the smallest eigenvalues of H*H, where H* is the complex conjugate of H;

Feature-4 ($f_4$): Real and imaginary parts of elements of the channel matrix;

Feature-5 ($f_5$): Magnitude-square of elements of channel matrix: $|h_{ij}|^2$;

Feature-6 ($f_6$): Real and imaginary parts of elements of R where R is an upper or lower triangular matrix such that H=QR, where Q is an unitary matrix satisfying QQ*=I=Q*Q;

Feature-7 ($f_7$): Magnitude-square of elements of R matrix: $|r_{ij}|^2$, where $r_{ij}$ is the element at the ith row and jth column in matrix R; and Feature-8 ($f_8$): y-h product: $y^*h_i$ where $h_i$ is the ith column of matrix H.

At 204 the system generates labels z for each RE. The detector label may be any integer from 1 to D. It may be assumed that the detector label is arranged in the ascending order of complexity where 1 indicates the lowest complexity detector and D indicates the highest complexity ML detector, although other orders of detectors may be utilized. $x_t$ indicates the transmitted symbols in the RE in MIMO layer-t. The symbol $x_t$ is represented by M transmitted bits as in Equation (2).

$$\{b_{t1}, b_{t2}, \ldots, b_{tM}\} \quad (2)$$

The transmitted symbol vector is x, as in Equation (3).

$$x = \begin{bmatrix} x_1 \\ x_2 \\ \vdots \\ x_T \end{bmatrix} \quad (3)$$

Using y and H, the system computes the LLR $L_{tm}^{(d)}$ for the mth bit in MIMO layer-t if detector d is used. The LLR $L_{tm}^{(d)}$ is the logarithm of the ratio of the probability that transmitted bit $b_{tm}$ is 1 to the probability that transmitted bit $b_{tm}$ is 0. For each candidate detector $d \in \{1, 2, \ldots, D\}$, the system obtains corresponding LLRs for M bits in each layer. The LLRs are used to generate a label indicating the lowest-complexity detector that can reliably achieve the same error rate as the ML. The system generates the label z using the LLR sign or using the LLR sign and magnitude.

When using the LLR sign to generate labels, the detector LLRs are converted to bits as in Equation (4).

$$b_{tm}^{(d)} = 1, \text{ if } L_{tm}^{(d)} > 0;$$

$$b_{tm}^{(d)} = 0, \text{ otherwise} \quad (4)$$

The label z is the smallest detector class d for which $b_{tm} = b_{tm}^{(d)}$, $t \in \{1, 2, \ldots, T\}$, $m = \{1, 2, \ldots, M\}$. Therefore, under this method, z is the lowest-complexity detector whose LLRs' sign matches true bits.

When generating labels using the LLR sign and magnitude, the system uses both a sign and a magnitude of a LLR to determine the detector label. LLR values are used to compute the probability, $p_t^{(d)}$, that the transmitted symbol $x_t$ in MIMO layer-t was equal to the symbol $x_t^{(d)}$ that is represented by bits $\{b_{t1}^{(d)}, b_{t2}^{(d)}, \ldots, b_{tm}^{(d)}\}$. This label generation method uses the same bits $b_{tm}^{(d)}$ computed in the method using only the LLR sign described above. The label z under this method is the smallest detector class d for which $p_t^{(d)} > \zeta$, $t = \{1, 2, \ldots, T\}$ for threshold $\zeta$.

At 206, the system generates a labelled dataset of features and labels for the Res. The labelled dataset tuples $\{f,z\}$ under different channel models and SNRs. The labelled dataset includes N tuples and each tuple contains channel features $f_1, f_2, \ldots, f_8$ and labels z.

At 208, the system processes the labelled datasets using class-merging and class-resampling. Class merging may be performed prior to training the MLP to manipulate the labelled data set to train the MLP such that it can accurately predict which REs require higher complexity detectors. For example, if there are D=4 detector classes, detector 4 is required for some REs depending on the channel conditions in order to achieve a corresponding error rate. Therefore, the MLP should have high training accuracy for detector class 4.

Figure 3:
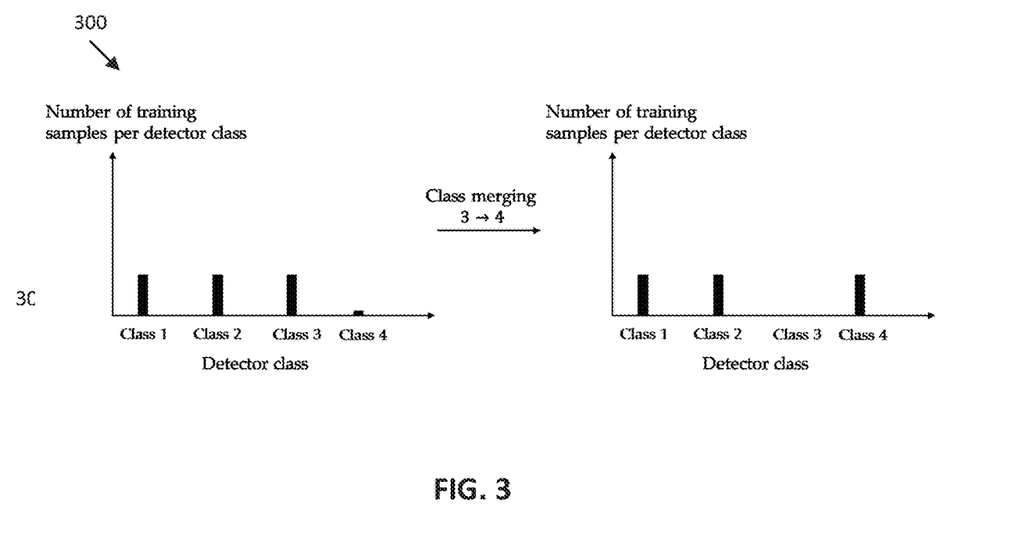
FIG. 3 is a diagram of class merging, according to an embodiment.

FIG. 3 is a diagram 300 of class merging, according to an embodiment. The training accuracy depends on the number of samples per class. As shown in graph 302, if class 4 has fewer training samples, then the MLP cannot achieve high training accuracy for class 4 which results in higher detection error. In order to achieve higher training accuracy for class 4, the system may merge class 3 into 4 by changing the label 3 to 4 as shown in graph 304. This is valid since the detectors are arranged in ascending order of complexity. Therefore, if the symbol can be detected accurately by detector 3, then it can also be detected accurately by detector 4.

Additionally, the system may re-sample the classes. Class re-sampling ensures that a training dataset does not contain an overwhelming number of samples with one detector class. Considering that the training dataset includes $N_d$ samples for detector d, such that $\Sigma_{d=1}^{D} N_d = N$, the cost function $c(w_{ij}^{(l)}, \beta_i^{(l)})$ depends on N and in turn depends on $N_d$.

Figure 4:
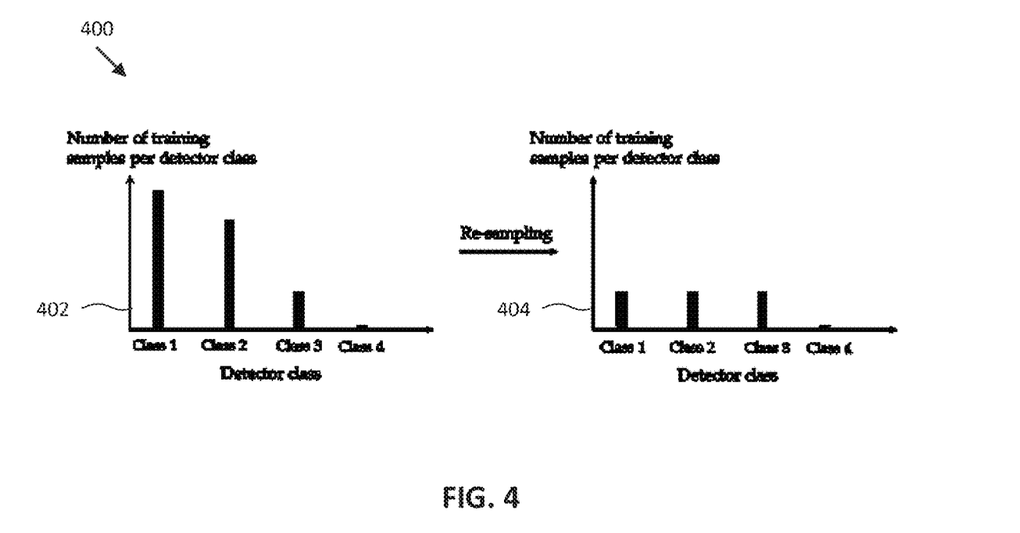
FIG. 4 is a diagram of class re-sampling, according to an embodiment.

FIG. 4 is a diagram 400 of class re-sampling, according to an embodiment. If one particular detector has significantly greater number of labels in the dataset, then the training is biased to that detector. As shown in graph 402, detector class 1 and class 2 include significantly greater number of labels than the other classes. This results in lower training accuracy for detectors which have fewer labels in dataset. To remove this bias, the system removes extra samples to ensure that most classes have equal number of training samples, as shown in graph 404.

At 210, the system identifies the most informative (relevant) features. The system may identify the most informative features regarding label z by using mutual information between label z and features $f_i$.

At 212, the system trains the MLP network using a most informative features and labels to find MLP weights 112.

Figure 5:
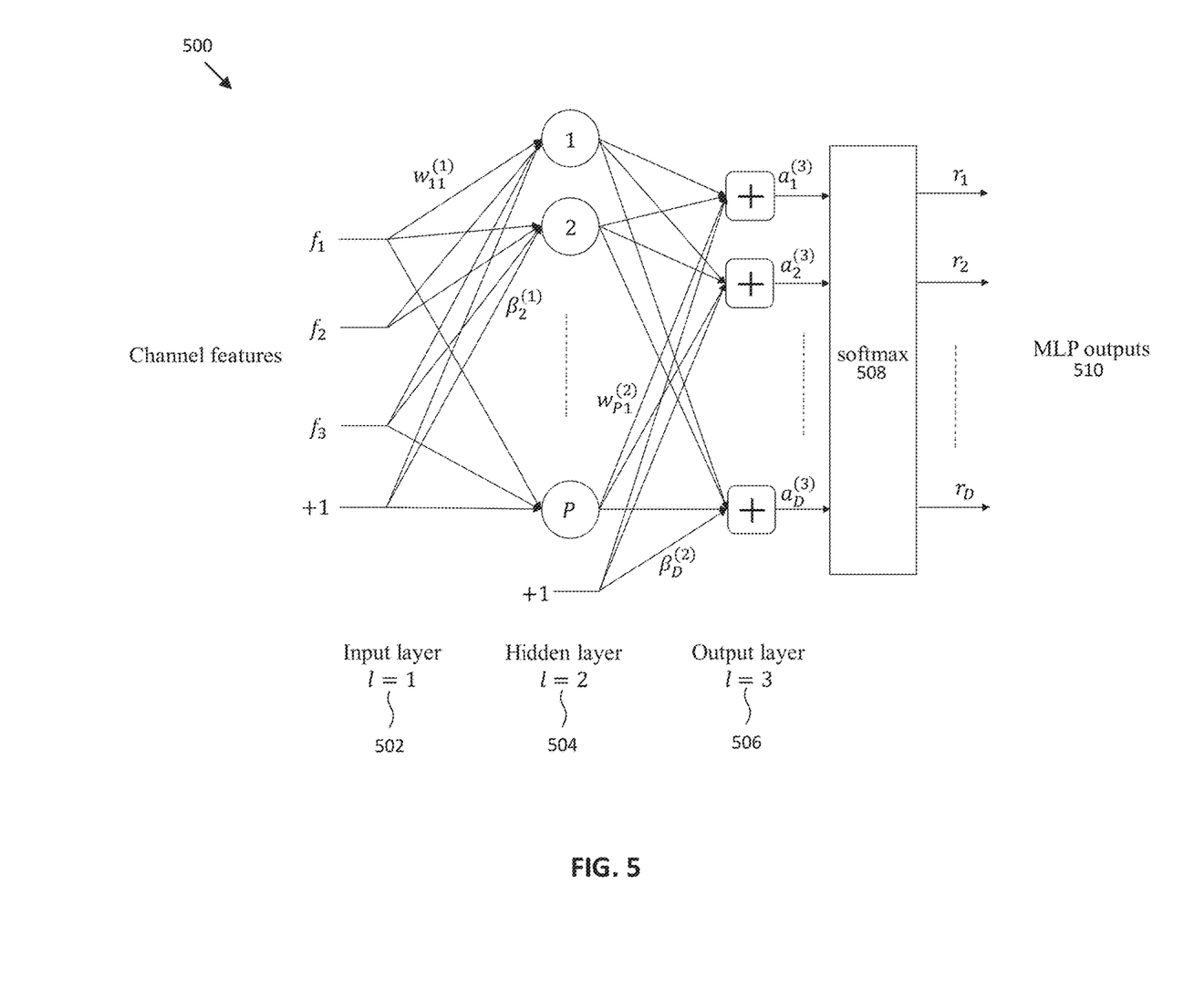
FIG. 5 is a diagram of an MLP network, according to an embodiment.

FIG. 5 is a diagram 500 of an MLP network, according to an embodiment. The MLP includes an input layer 502, one hidden layer 504, an output layer 506 and P nodes. The hidden nodes use a sigmoid activation function. The outputs 510 of the MLP are computed by applying a softmax function 508 on the output layer 506, which includes of D nodes. $w_{ij}^{(l)}$ indicates the weight between j-th node in l-th layer to i-th node in layer (l+1), and the output of the node i in layer l=2 is as Equation (5).

$$a_i^{(2)} = g\left(\sum_j w_{ij}^{(1)} f_j + \beta_i^{(1)}\right), i = 1, 2, \ldots, P, \quad (5)$$

In Equation (5), $$g(x) = \frac{1}{1 + e^{-x}}$$

is the sigmoid activation function and $\beta_i^{(1)}$ is the bias term. The output of node i in layer l=3 is as Equation (6).

$$a_i^{(3)} = \sum_j w_{ij}^{(2)} a_j^{(2)} + \beta_i^{(2)}, i = 1, 2, \ldots, D \quad (6)$$

The output of the MLP is computed by applying a softmax on $\{a_1^{(3)}, a_2^{(3)}, \ldots, a_D^{(3)}\}$, as in Equation (7).

$$r_i = \frac{e^{a_i^{(3)}}}{\sum_j e^{a_j^{(3)}}}, i = 1, 2, \ldots, D \quad (7)$$

In order to obtain weight and bias terms $\{w_{ij}^{(l)}, \beta_i^{(l)}\}$, the system trains the MLP network using quasi-Newton method to minimize the cross-entropy cost function in Equation (8).

$$c(w_{ij}^{(l)}, \beta_i^{(l)}) = -\sum_{n=1}^{N} \sum_{d=1}^{D} I(z_n = d) \log(r_{d,n}) \quad (8)$$

In Equation (8), $1(z_n=d)$ is an identity function (1 if $z_n=d$, and 0 otherwise), $z_n$ in the label in the n-th training tuple, and $r_{d,n}$ is the MLP output corresponding to n-th training tuple.

Figure 6:
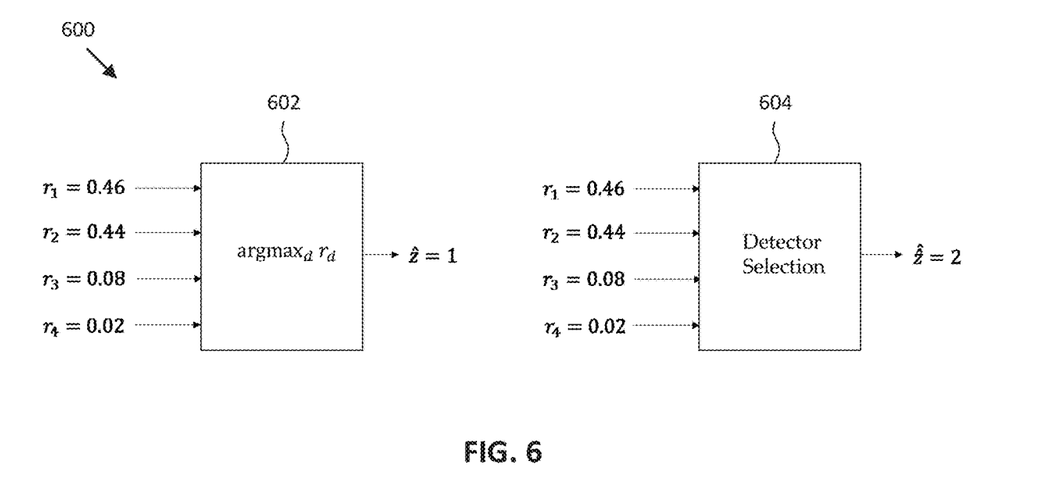
FIGS. 6 and 7 are diagrams of detector selection methods, according to an embodiment.
Figure 7:
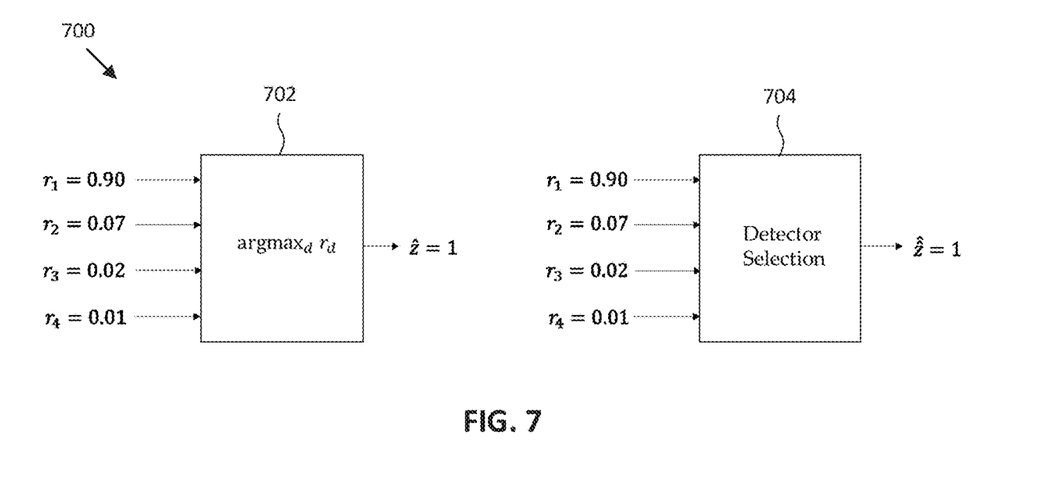

FIGS. 6 and 7 are diagrams 600 and 700 of detector selection methods using MLP outputs $r_1, \ldots, r_D$, according to an embodiment. As described below, z is the true class and $\hat{z}$ is the selected class. In a first selection method 602 and 702, the class is selected by checking which class has the maximum $r_d$ output value, as in Equation (9).

$$\hat{z} = \operatorname{argmax}_d r_d \quad (9)$$

In the selection method of 602 and 702, the underestimation error may be high. Under-estimation error occurs when the MLP estimates a lower complexity detector when a higher complexity detector is required (i.e., $\hat{z}<z$). In a second selection method 604 and 704, the system selects the detector class by keeping the probability of underestimation error below a threshold $\epsilon$ using Margins 105.

At 214, the system selects a detector class based on MLP outputs and computed margins. To select a reliable detector class, a selection margin $\gamma_d$ is provided for $r_d$ such that the MLP selects detector d only when $r_d$ is maximum among all MLP outputs and $r_d-r_{d+1}>\gamma_d$. For example, in FIG. 6, D=4, $\gamma_i=0.5$, and the MLP outputs are $r_1=0.46$, $r_2=0.44$, $r_3=0.08$, and $r_4=0.02$. Since the difference between $r_1$ and $r_2$ is small, detector 1 is not reliable. In this scenario, the second selection method 604 selects detector 2, while the first selection method 602 selects detector 1. Detector 2 is more reliable than detector 1 in this case. Further, in FIG. 7, the MLP outputs are $r_1=0.90$, $r_2=0.07$, $r_3=0.02$, and $r_4=0.01$. In this case, detector 1 itself is reliable since the difference between $r_1$ and $r_2$ is large and the second selection method 704 selects detector 1.

The margins $\gamma_d$, d=1, 2, ..., D are designed to keep the probability of underestimation error below a threshold E. For a given margin $\gamma_d$, the error occurs when $r_d-r_{d+1}>\gamma_d$ while the true class is z=d+1 and the probability of error is as Equation (10).

$$Pr(r_d-r_{d+1}>\gamma_d; z=d+1) \quad (10)$$

If the margin $\gamma_d$ is too high (e.g., $\gamma_d=1$), then the second selection method always selects class d+1 even though true class is d. This results in utilization of a high complexity detector even when it is not required. To avoid this, the conditional probability $Pr(r_d-r_{d+1}>\gamma_d|z=d)$ is maximized. Thus, the margins $\gamma_1, \gamma_2, \ldots \gamma_{D-1}$ are determined by solving the optimization problem using an error threshold value E in Equation (11) for d=1, 2, ..., D−1.

$$\max_{\gamma_d} Pr(r_d - r_{d+1} > \gamma_d | z = d) \quad (11)$$

subject to $Pr(r_d - r_{d+1} > \gamma_d; z = d + 1) \leq \epsilon$

The margins may be used to obtain selection of the class by following the pseudo code in Table 1.

TABLE 1

Initialize $\hat{z} = D$ and $z_0 = \operatorname*{argmax}_{d \in \{1,2,\ldots,D\}} r_d$ IF $z_0 < D$
  FOR d = $z_0$, $z_0$ + 1, ..., D − 1
    IF $r_d - r_{d+1} > \gamma d$
      $\hat{z}$ = d
      BREAK
    ENDIF
  ENDFOR
ENDIF The present system and method may be used to select the detector under different SNRs, modulation and coding scheme (MCS) and channel models. A combined labelled dataset is obtained covering these scenarios and the MLP is trained to select the detector. The system and method can also be extended to select detectors for different modulation types such as 64-quadrature amplitude modulation (QAM), 256-QAM, and 1024-QAM.

For example, for detector selection for two modulations $M_1$=64-QAM and $M_2$=256-QAM, $D_1$ and $D_2$ are the number of candidate detector classes for 64-QAM and 256-QAM, respectively. A combined dataset is generated which included labelled data from REs using 64-QAM symbols and 256-QAM symbols. In this dataset, the detector labels for 64-QAM are in the range while labels for 256-QAM are in the range $D_1+1, D_1+2, \ldots, D_1+D_2$. The MLP is trained with the combined dataset and the selection margins $\gamma_1, \gamma_2, \ldots, \gamma_{D_1+D_2-1}$ are computed.

In order to select the detector for RE with transmitted symbols from $M_1$, the MLP outputs $r_1, r_2, r_{D_1}$ are used along with margins $\gamma_1, \gamma_2, \ldots, \gamma_{D_1}$ as shown in the pseudo code in Table 2.

TABLE 2

Initialize $\hat{z} = D_1$ and $z_0 = \operatorname*{argmax}_{d \in \{1,2,\ldots,D_1\}} r_d$ IF $z_0 < D_1$
  FOR d = $z_0$, $z_0$ + 1, ..., $D_1$ − 1
    IF $r_d - r_{d+1} > \gamma_d$
      $\hat{z}$ = d
      BREAK
    ENDIF
  ENDFOR
ENDIF To select the detector for REs with transmitted symbols from $M_2$, the MLP outputs $r_{D_1+1}, r_{D_1+2}, \ldots, r_{D_1+D_2}$ are used along with margins $\gamma_{D_1+1}, \gamma_{D_1+2}, \ldots, \gamma_{D_1+D_2-1}$ as shown in the pseudo code in Table 3.

TABLE 3

Figure 8:
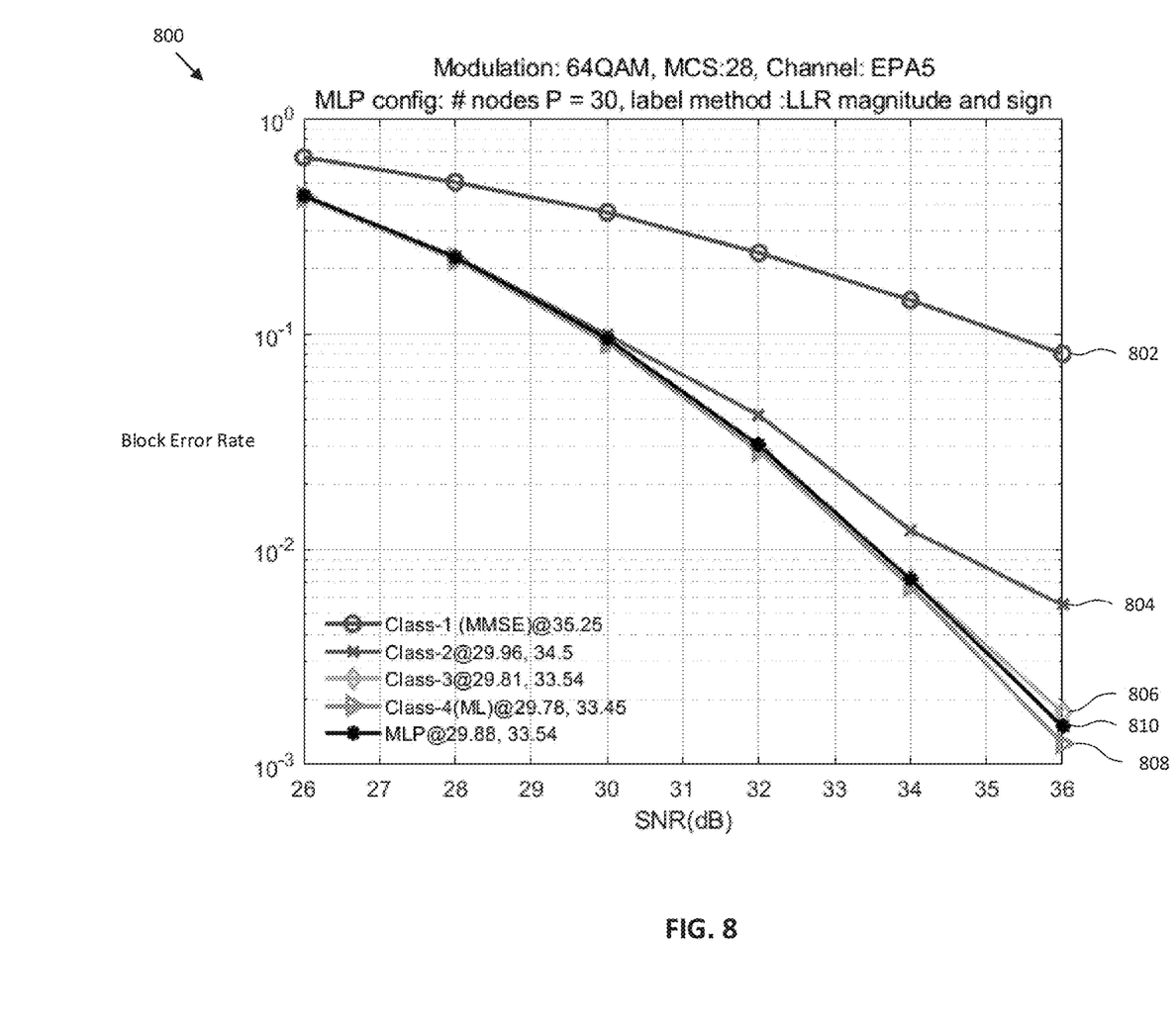
FIG. 8 is a graph of online detector selection results, according to an embodiment.

Initialize $\hat{z} = D_1 + D_2$ and $z_0 = \underset{d \in \{D_1+1,\ldots,D_1+D_2\}}{\operatorname{argmax}} r_d$ IF $z_0 < D_1 + D_2$
  FOR $d = z_0, z_0 + 1, \ldots, D_1 + D_2 - 1$
    IF $r_d - r_{d+1} > \gamma_d$
      $\hat{z} = d$
      BREAK
    ENDIF
  ENDFOR
ENDIF FIG. 8 is a graph 800 of online detector selection results, according to an embodiment. FIG. 8 shows the block error rate for static detector selection when detector classes 1 (802), 2 (804), 3 (806), and 4 (808) are used for all REs. Class 4 808 is the ML detector with the highest complexity and lowest error rate, while class 1 802 is the MMSE detector with the lowest complexity and highest error rate. Graph 800 also shows error rate 810 of the proposed MLP based dynamic detector selection.

Figure 9:
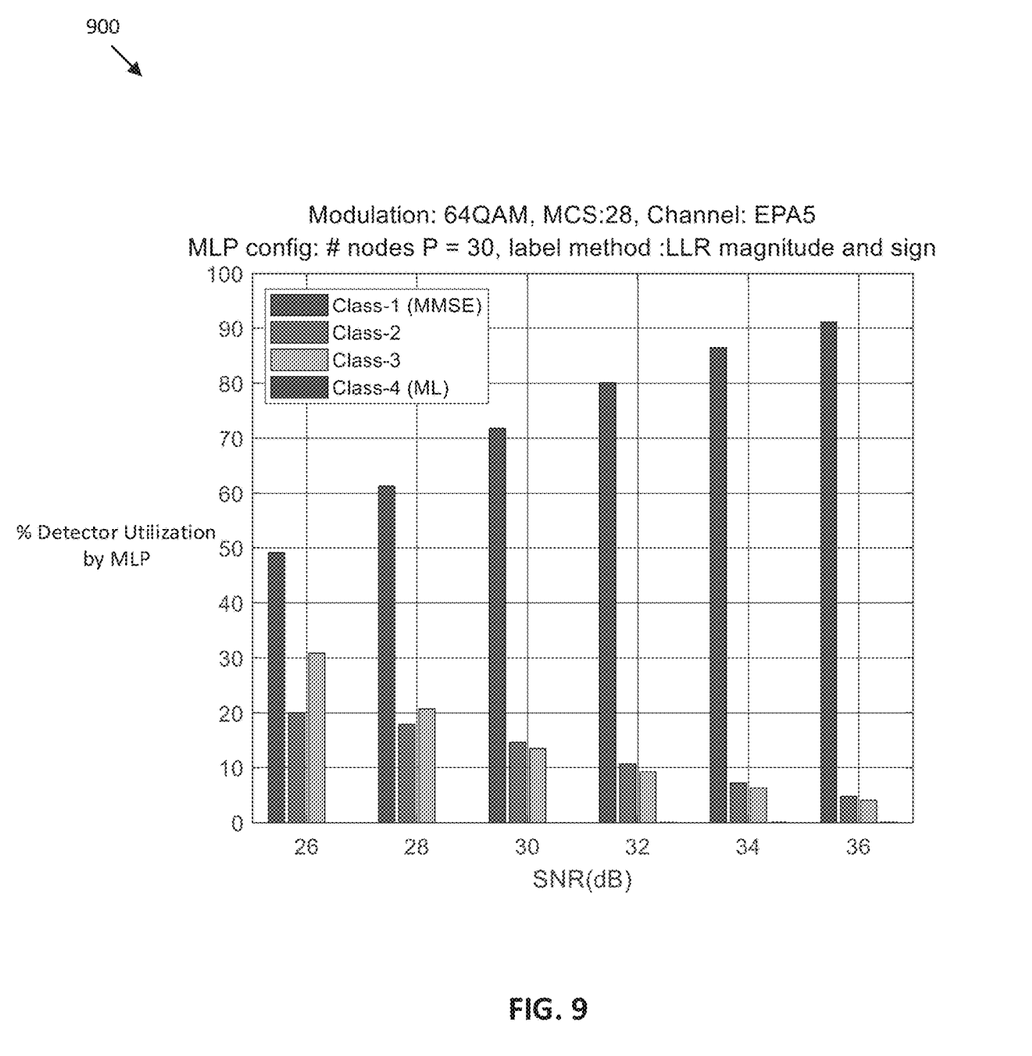
FIG. 9 is a diagram of detector utilization, according to an embodiment.

FIG. 9 is a diagram 900 of detector utilization, according to an embodiment. As shown in diagram 900, the system utilizes low complexity detectors, while providing an error rate similar to that of an ML (class 4) detector.

Figure 10:
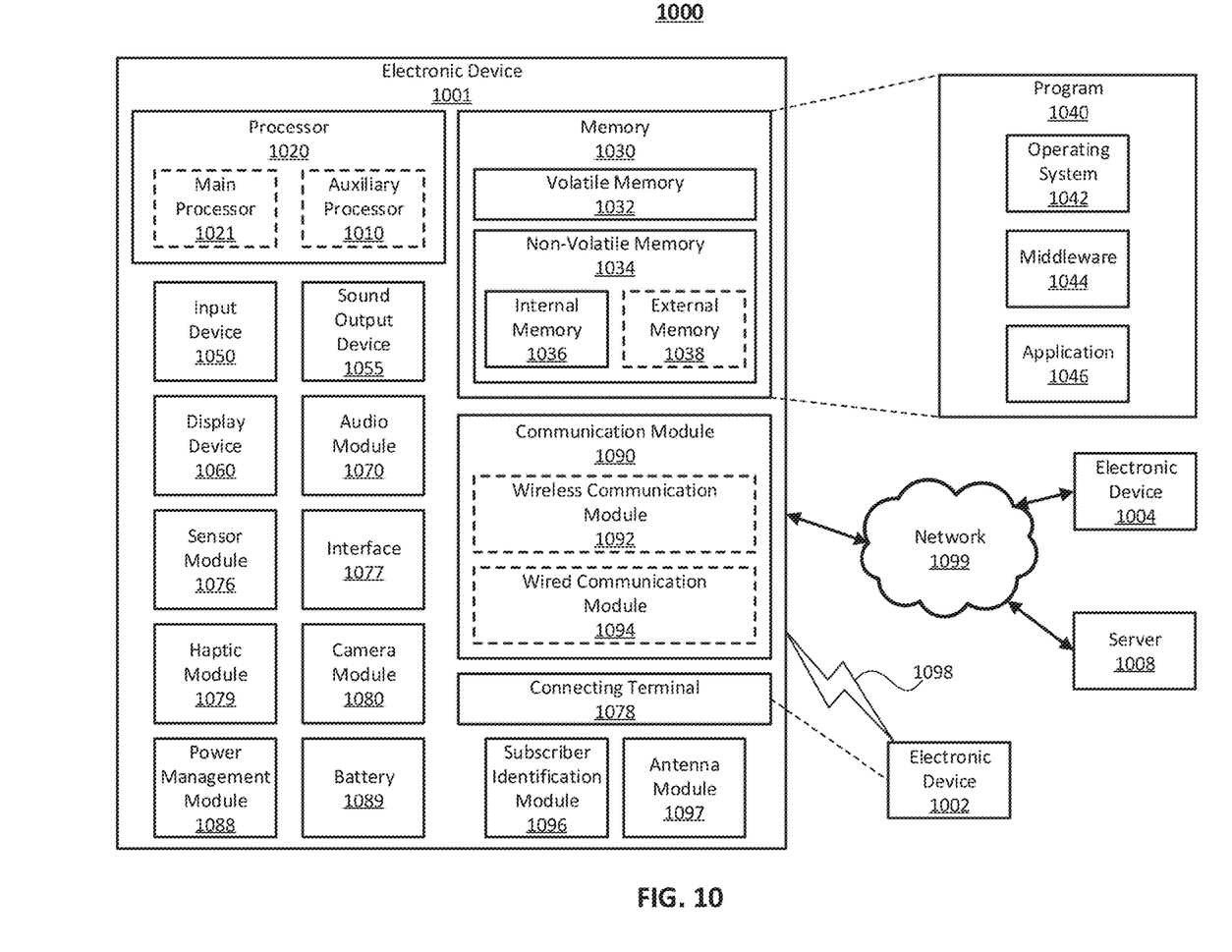
FIG. 10 is a block diagram of an electronic device in a network environment, according to one embodiment.

FIG. 10 is a block diagram of an electronic device 1001 in a network environment 1000, according to one embodiment. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In one embodiment, at least one (e.g., the display device 1060 or the camera module 1080) of the components may be omitted from the electronic device 1001, or one or more other components may be added to the electronic device 1001. In one embodiment, some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute, for example, software (e.g., a program 1040) to control at least one other component (e.g., a hardware or a software component) of the electronic device 1001 coupled with the processor 1020, and may perform various data processing or computations. As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to one embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to one embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to one embodiment, the audio module 1070 may obtain the sound via the input device 1050, or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. According to one embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. According to one embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. According to one embodiment, the haptic module 1079 may include, for example, a motor, a piezoelectric element, or an electrical stimulator.

The camera module 1080 may capture a still image or moving images. According to one embodiment, the camera module 1080 may include one or more lenses, image sensors, image signal processors, or flashes.

The power management module 1088 may manage power supplied to the electronic device 1001. The power management module 1088 may be implemented as at least part of, for example, a power management integrated circuit (PMIC).

The battery 1089 may supply power to at least one component of the electronic device 1001. According to one embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. According to one embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to one embodiment, the antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

One embodiment may be implemented as software (e.g., the program 1040) including one or more instructions that are stored in a storage medium (e.g., internal memory 1036 or external memory 1038) that is readable by a machine (e.g., the electronic device 1001). For example, a processor of the electronic device 1001 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of using a multi-layer perceptron (MLP) network to select a low-complexity, reliable detector, the method comprising:
    receiving a signal vector and a multiple-input multiple-output (MIMO) channel matrix of resource elements (REs);
    extracting channel features from the signal vector and the MIMO channel matrix;
    generating a labelled dataset of the channel features and detector labels for each of the RE;
    training the MLP network using the generated labelled dataset;
    computing a margin associated with a maximum output value from the MLP network, wherein the computed margin is determined based on a conditional probability of detector error being less than or equal to a probability threshold value;
    selecting, for an RE, a detector class from a plurality of detector classes based on a difference between the maximum output value from the MLP network and a second output value from the MLP network being less than the computed margin; and
    detecting symbols in the RE using a MIMO detector corresponding to the selected detector class.

2. The method of claim 1, wherein the labelled dataset is generated based on a log-likelihood ratio (LLR) sign.

3. The method of claim 2, wherein the labelled dataset is further generated based on an LLR magnitude.

4. The method of claim 1, further comprising merging classes of the plurality of detector classes based on the generated labelled dataset.

5. The method of claim 4, wherein merging classes further comprises merging samples in a first class of the plurality of classes into a second class of the plurality of classes, wherein the second class includes fewer samples than the first class.

6. The method of claim 1, wherein selecting the detector class further comprises minimizing a probability of detector error.

7. The method of claim 1, wherein the channel features include at least one of eigenvalues of a channel, diagonal values of a channel matrix, and an inner product of received signals and the channel.

8. A system using a multi-layer perceptron (MLP) network to select a low-complexity, reliable detector, the system comprising:
    a plurality of detectors, each of the detectors associated with a detector class from a plurality of detector classes;
    a memory; and
    a processor configured to:
        receive a signal vector and a multiple-input multiple-output (MIMO) channel matrix of resource elements (REs);
        extract channel features from the signal vector and the MIMO channel matrix;
        generate a labelled dataset of the channel features and detector labels for each of the RE;
        train the MLP network using the generated labelled dataset;
        compute a margin associated with a maximum output value from the MLP network, wherein the computed margin is determined based on a conditional probability of detector error being less than or equal to a probability threshold value;
        select, for an RE, a detector class from the plurality of detector classes based on a difference between the maximum output value from the MLP network and a second output value from the MLP network being less than the computed margin; and
        detect symbols in the RE using a MIMO detector corresponding to the selected detector class.

9. The system of claim 8, wherein the labelled dataset is generated based on a log-likelihood ratio (LLR) sign.

10. The system of claim 9, wherein the labelled dataset is further generated based on an LLR magnitude.

11. The system of claim 8, wherein the processor is further configured to merge classes of the plurality of detector classes based on the generated labelled dataset.

12. The system of claim 11, wherein the processor is further configured to merge samples in a first class of the plurality of classes into a second class of the plurality of classes, wherein the second class includes fewer samples than the first class.

13. The system of claim 8, wherein the processor is further configured to select the detector class by minimizing a probability of detector error.

14. A method of using a multi-layer perceptron (MLP) network to select a low-complexity, reliable detector, the method comprising:
- receiving a signal vector and a multiple-input multiple-output (MIMO) channel matrix of resource elements (REs);
- extracting channel features from the signal vector and the MIMO channel matrix;
- generating a labelled dataset of the channel features and detector labels for each of the RE;
- merging classes of a plurality of detector classes based on the generated labelled dataset;
- training the MLP network using the generated labelled dataset;
- computing a margin associated with a maximum output value from the MLP network, wherein the computed margin is determined based on a conditional probability of detector error being less than or equal to a probability threshold value;
- selecting, for an RE, a detector class from the merged plurality of detector classes based on a difference between the maximum output value from the MLP network and a second output value from the MLP network being less than the computed margin; and
- detecting symbols in the RE using a MIMO detector corresponding to the selected detector class.

* * * * *